(12) United States Patent
Adams

(10) Patent No.: US 6,357,818 B1
(45) Date of Patent: Mar. 19, 2002

(54) TRAILER WIRING RETENTION AND PROTECTION SYSTEM

(75) Inventor: James H. Adams, Tallmadge, OH (US)

(73) Assignee: East Manufacturing, Randolph, OH (US)

(*) Notice: Subject to any disclaimer, the term of this patent is extended or adjusted under 35 U.S.C. 154(b) by 0 days.

(21) Appl. No.: 09/453,640

(22) Filed: Dec. 3, 1999

(51) Int. Cl.⁷ .............................. H05K 5/06; B60N 3/00; B60R 27/00

(52) U.S. Cl. .................... 296/181; 174/720; 174/50.57; 174/52.2; 174/52.3

(58) Field of Search ................................. 296/181, 182; 439/31; 174/72 A, 72 C, 50.5, 50.51, 50.54, 52.2, 52.3

(56) References Cited

U.S. PATENT DOCUMENTS

| | | | | |
|---|---|---|---|---|
| 3,909,504 A | * | 9/1975 | Browne | 174/52 PE |
| 4,175,245 A | * | 11/1979 | Merlack et al. | 174/71 R |
| 4,280,062 A | * | 7/1981 | Miller et al. | 301/10 LS |
| 4,332,975 A | * | 6/1982 | Dienes | 174/77 R |
| 4,358,634 A | * | 11/1982 | Dienes | 174/88 R |
| 4,451,696 A | * | 5/1984 | Beinhaur | 174/92 |
| 4,703,948 A | * | 11/1987 | Ehrlich | 296/208 |
| 4,864,081 A | * | 9/1989 | Bates | 174/88 R |
| 5,208,728 A | * | 5/1993 | Schirmer | 174/52.3 |
| 5,428,512 A | * | 6/1995 | Mouzas | 362/80 |
| 5,448,014 A | * | 9/1995 | Kong et al. | 174/52.3 |
| 5,639,049 A | * | 6/1997 | Jennings et al. | 248/74.2 |
| 5,744,218 A | * | 4/1998 | Barnes | 174/72 A |
| 5,769,478 A | * | 6/1998 | Vernese | 296/181 |
| 5,890,757 A | * | 4/1999 | Masterson et al. | 296/181 |
| 5,940,962 A | * | 8/1999 | Shima et al. | 174/72 A |
| 5,942,724 A | * | 8/1999 | Russo et al. | 174/72 A |
| 5,973,265 A | * | 10/1999 | O'Brien et al. | 174/72 A |
| 6,019,323 A | * | 2/2000 | Jette | 248/49 |
| 6,126,228 A | * | 10/2000 | Davis, Jr. et al. | 174/72 A |
| 6,142,556 A | * | 11/2000 | Tanaka et al. | 174/72 A |

\* cited by examiner

*Primary Examiner*—Joseph D. Pape
*Assistant Examiner*—Hilary Gutman
(74) *Attorney, Agent, or Firm*—Scott M. Oldham of Hahn, Loeser + Parks, LLP

(57) ABSTRACT

This invention relates to a trailer body including a wiring protection system wherein a trailer body is supported at least in part on a plurality of wheels and has at least a floor associated therewith. The trailer body includes a wiring system to supply electrical energy to components situated at positions about the body of the trailer. The wiring system includes a plurality of individual wire sections being selectively coupled to the components via an electrical splice adjacent the component. A sealing compound is formed into a sheet member having a predetermined configuration, with the sheet member being selectively attachable to a surface of the trailer body about the electrical splice and adjacent the electrical component. The sealing compound will seal the splice from the external environment and maintain the position of the wire section including the splice in relation to the trailer body.

16 Claims, 2 Drawing Sheets

TRAILER WIRING RETENTION AND PROTECTION SYSTEM

TECHNICAL FIELD

The present invention relates to a wiring retention and protection system for a trailer used in the transportation of goods or materials. Such trailers include flatbed trailers, open top semi-trailer vehicles as well as van trailer vehicles, all of which have various similarities in construction. Such trailers typically include a heavy duty frame construction on which is supported a floor system with or without sides and top. The frame is supported on a number of wheels, and a coupling mechanism is used to attach the trailer to a drive vehicle for transport. Under regulatory requirements, such trailers are equipped with lighting systems for use at night or in other driving conditions. Such lighting systems typically include a number of individual lights positioned along the periphery of the floor and/or side or top walls of the trailer vehicle, and requires a complex wiring system in order to provide electrical energy to each light. This wiring system extends from a central port and suitable electrical coupler to receive power from the drive vehicle engine.

A problem has been encountered in such trailer systems, in that portions of the wiring system supplying electrical power to the lighting system of the trailer are exposed to the environment, and subject to deterioration and failure. Attempts have been made to fashion into the frame or floor of a trailer system various wire carrying mechanisms, such as clips or grooves in which wires may be generally directed toward their destination light. Although such attempts have helped in part to protect the wiring systems there are still a variety of positions on the trailer where the wires are exposed, particularly at locations susceptible to failure. For example, the wiring systems will have a variety of splice locations where the wiring system is coupled to a wiring system associated with a particular light fixture. At such locations, it is also typical that the wiring system is not engaged with the trailer frame, making it even more susceptible to damage or deterioration. It is possible at such locations that the wiring system can be entangled with an external structure, which also can cause more significant damage to the system. A simply used and effective system to retain and protect the electrical wiring system in association with trailers of this type would therefore be desirable to lengthen the life of the electrical system and facilitate in obtaining its operational integrity.

SUMMARY OF THE INVENTION

It is therefore an object of the invention to provide a trailer wiring retention and protection system which overcomes the disadvantages of the prior trailer constructions and provides protection against environmental conditions in which the trailer is used.

It is a further object of the invention to provide a protection and retention system which may be retrofit to a trailer construction, or which may be integrated as part of an original equipment manufactured trailer.

These and other objects and advantages of the invention are accomplished in a trailer including a wiring protection system which comprises a trailer body supported at least in part on a plurality of wheels and having at least a floor associated therewith. The trailer body includes a wiring system to supply electrical energy to components situated at positions about the body of the trailer. The wiring system comprises a plurality of individual wire sections being selectively coupled to the components via an electrical splice adjacent the component. A sealing compound is formed into a sheet-like member having a predetermined configuration, with the sheet member being selectively attachable to a surface of the trailer body about the electrical splice and adjacent the electrical component. The sealing compound in this matter will seal the splice from the external environment and maintain the position of the wire section including the splice in relation to the trailer body.

DETAILED DESCRIPTION OF THE PREFERRED EMBODIMENTS

Figure 1:
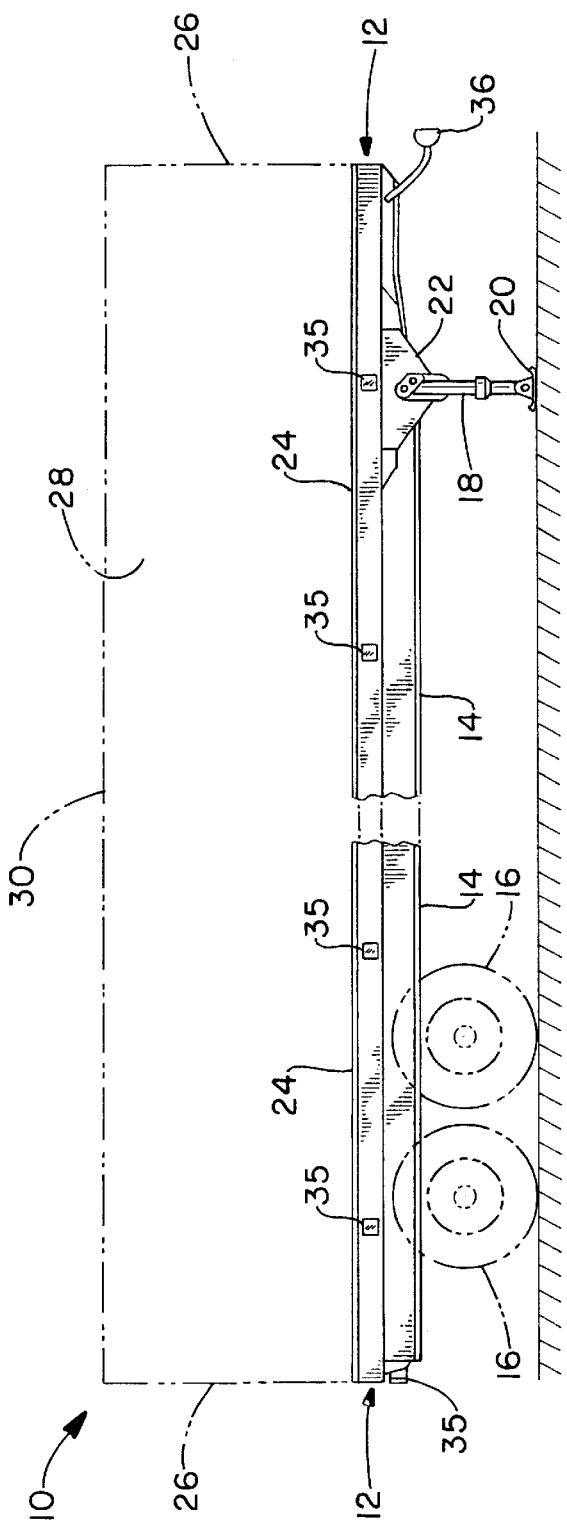
FIG. 1 is a side plan view of a trailer vehicle, the trailer vehicle including a wiring protection system according to the invention.

Turning now to the figures, FIG. 1 shows a typical trailer construction which includes a trailer generally indicated at 10 of relatively typical constriction. The trailer 10 includes a body 12, which in a flatbed trailer may include one or more supporting beams 14 supported at least in part on a plurality of wheels 16 and a wheel support assembly (not shown), positioned under the rear portion of the trailer 10 and secured to support beams 14. A retractable dual leg support 18 having a ground engaging shoe 20 may be secured to the forward portion of the trailer 10 by brackets 22 or in another suitable arrangement. A floor 24 may be provided in association with the body 12, forming a support surface on which goods or materials maybe positioned for transport on trailer 10. In use, trailer 10 is coupled at a front portion thereof to a drive vehicle as is understood to those skilled in the art. Trailer 10 may also include an enclosure in conjunction with floor 24 which may include front and back walls 26, sidewalls 28, and for a fully enclosed van-type trailer a top wall 30. Any of these types of trailers will further include a lighting system comprising electrical components or light fixtures 35 positioned at various locations along the peripheral edges of the trailer 10, for operation of the trailer at night or under other transport conditions where lighting on the trailer is required for safety. Each of the lighting fixtures 35 is coupled to a wiring system, and particularly to individual wire sections which are selectively coupled to the light fixtures or other electrical components via an electrical splice adjacent the component as will be hereinafter described in more detail. The wiring system is then centralized to a suitable electrical connection such as plug 36 situated at a forward end of trailer 10. The plug 36 may then be selectively coupled to a suitable electrical connector in association with the drive vehicle, to couple electrical power from the drive vehicle to the wiring system in trailer 10. The individual wire sections will then couple electrical power to the light fixtures 35 or other electrical components as desired. Each of the lighting fixtures 35 is coupled to a wiring system, and particularly to individual wire sections which are selectively coupled to the light fixtures or other electrical components via an electrical splice adjacent the component as will be hereinafter described in more detail. The wiring system is then centralized to a suitable electrical connection such as plug 36 situated at a forward end of trailer 10. The plug 36 may then be selectively coupled to a suitable electrical connector in association with the drive vehicle, to couple electrical power from the drive vehicle to the wiring system in trailer 10. The individual wire sections will then couple electrical power to the light fixtures 35 or other electrical components as desired.

Figure 2:
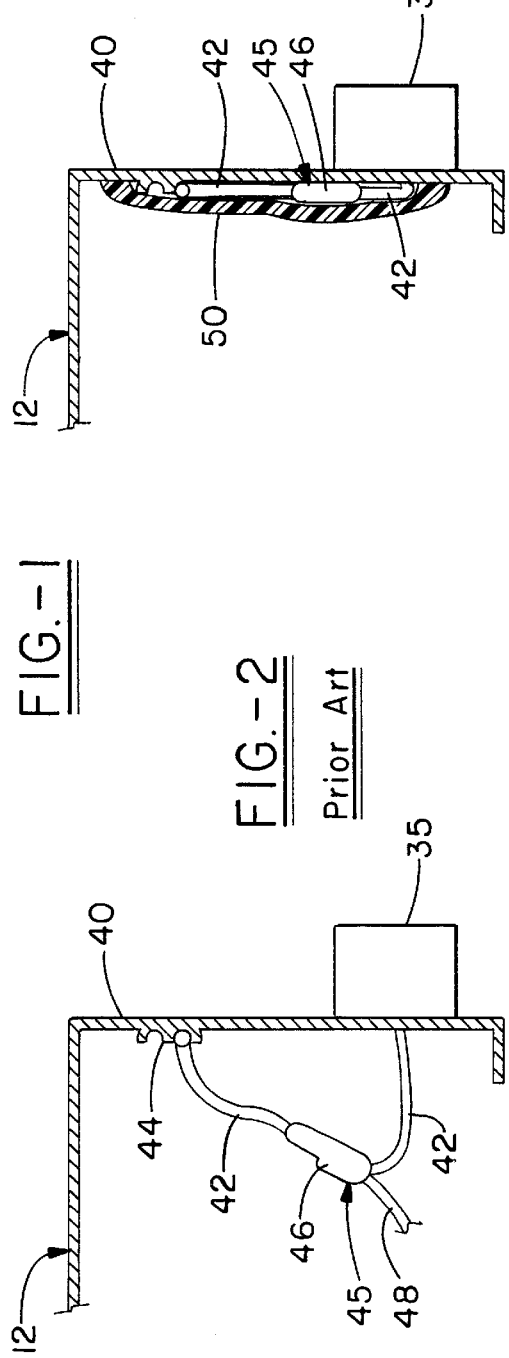
FIG. 2 is an enlarged partial sectional view of a portion of a trailer body including a wiring system for an electrical component provided in association with the body, according to the prior art.

Turning to FIG. 2, the location of a light fixture 35 in relation to trailer body 12 is shown in cross section. For example, the portion of body 12 as shown in FIG. 2 may correspond to an outside edge of the trailer floor 24 in which light fixtures 35are positioned, such as shown in FIG. 1. Light fixtures 35 are positioned in a variety of locations, and although not of identical configuration as that shown in FIG. 2, are in general mounted on an exterior wall 40 associated with the trailer body, which may be positioned with respect to the floor 24, the support beams 14 or in conjunction with front or back walls 26, sidewalls 28 or in some instances top wall 30 as shown in FIG. 1. A section of wire 42 is used to couple the electrical system of a drive vehicle or the like to the light fixture 35. The wire section 42 may be fed from the connecting plug 36 and through a wire guide 44 formed in body 12, to a position adjacent electrical component 35. At this location, wire section 42 is typically connected to electrical component or light fixture 35 by simply removing this portion of the wire from guide 44, and splicing the wire by means of a wire harness 46 known to those skilled in the art. A suitable wire harness, such as produced by Maxi-Seal, Grote or Truck-Lite, allow such splices to be performed at a location adjacent electrical component 35, while also allowing continuous electrical coupling through a further wire section 48. Other suitable electrical splices may also be utilized other than wire harness 46 if desired. It is important at the location of a splice as generally designated 45, that any bare conductors in the wiring system be insulated against undesirable short circuits, and preferably sealed against contaminants. Typically, the splice 45 has been wrapped with a dielectric tape or a deformable material having sealing properties. A wire harness 46 is an attempt to splice electrical conductors while providing some protection but as sown in FIG. 2, the wire sections 42 remain vulnerable to damage due to foreign objects or structures entering the space in which splice 45 is positioned. As the wire sections 42 are simply free floating between wire guide 44 and the connection to fixture 35, the wires are particularly susceptible to being caught on external structures which will damage or cause failure of the electrical coil connection at this site. Further, although wire harness 46 provides some protection against the external environment, this prior art arrangement made the splice 45 susceptible to the ingress of moisture or other contaminants which could effect proper functioning of the wiring system. In addition, this prior art arrangement of splicing the wiring system to the electrical component 35 is vulnerable to damage from excessive bending or puncture of the spliced area due to the free floating nature of the wire sections 42.

Figure 3:
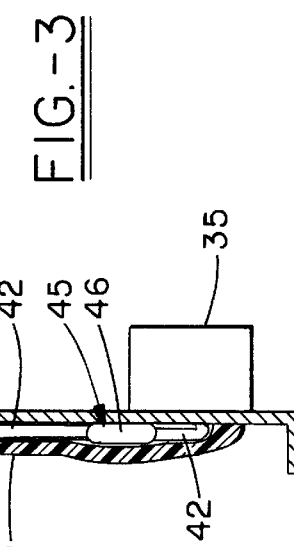
FIG. 3 shows an enlarged partial sectional view of a portion of a trailer body including a wiring system for an electrical component provided in association with the body, and having the wiring protection system according to the invention.
Figure 4:
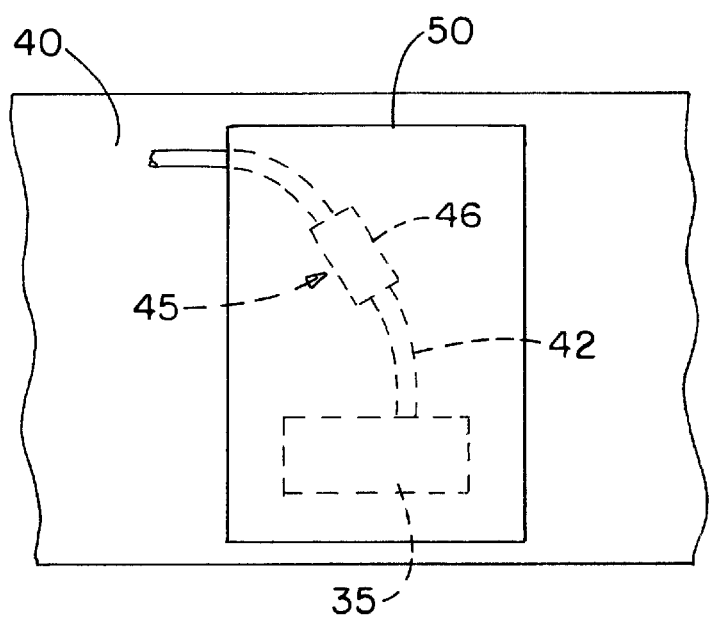
FIG. 4 shows a partial plan view of a sealing sheet which may be used in the wiring protection system according to the invention.

Turning to FIGS. 3–4, the wiring protection system according to an embodiment of the invention is shown in more detail. In order to alleviate the problems with the prior art as shown in FIG. 2, a sealing compound formed into a sheet 50 is positioned to surround the splice 45, and associated wire sections 42 to environmentally seal, and insulate the splice 45 in the electrical wiring system. The sheet 50 has a predetermined configuration matching the splice location so as to fully encompass splice 45 and associated wire sections 42. In this manner, the portions of the wiring system adjacent electrical fixture 35 are encompassed between the sealing sheet 50 and a wall 40 of the trailer body, such as exterior wall 40 as shown in FIG. 3. Thus for the particular embodiment shown in these figures, the sheet 50 may be rectilinear in configuration, having elongated sides to match the configuration of wall 40, while providing a width to fully encompass splice 45 and associated wire sections 42 thereunder. The sealing compound from which sheet 50 is made is also selectively secured to the wall 40 in a suitable manner, and the sealing material itself may have adhesive characteristics to allow it to be fully secured to wall 40 about splice 45 by applying pressure on the periphery thereof. Alternatively, sheet 50 may be otherwise selectively secured about splice 45 by means of another suitable fastening arrangement, such as by the use of an adhesive as an example. Of importance is that sheet 50 be sealed about splice 45 and associated wire sections 42 in an essentially airtight/moisture resistant manner to seal the arrangement from the outside environment to which the location is subjected. The sheet 50 when positioned in this manner also acts to reduce the strain of the wire sections 42 in conjunction with splice 45, and positions the entire assembly directly adjacent wall 40 so as to minimize potential interference from external agents.

Figure 5:
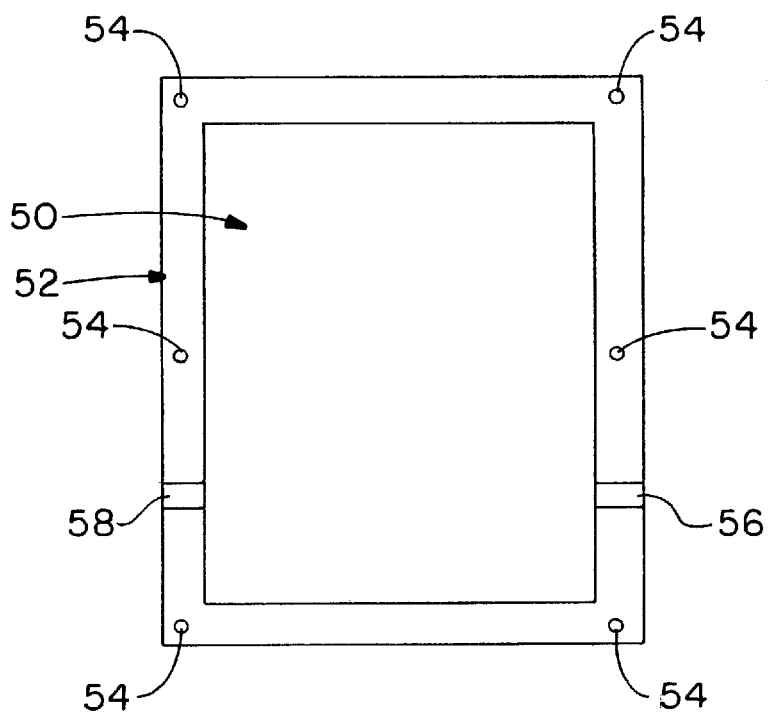
FIG. 5 shows an alternative embodiment of a sealing sheet for use in the wiring protection system according to the invention.

Turning to FIG. 5, an alternative embodiment of the sealing and protection system according to the invention is shown. As previously indicated, the invention may be utilized in either a retrofit manner, wherein the splice locations of the wiring system could be cleaned and sealing sheet 50 applied in a manner as shown, or sealing sheet 50 may be positioned as part of original manufacture of trailer 10. To facilitate positioning of sheet 50, and to ensure secure fastening about splice 45, the sealing material from which sheet 50 is made may be positioned on an outer frame 52 which may be constructed of a suitable material to prevent ingress of external environmental contaminants. The frame 52 may include a plurality of fastening holes 54 or may otherwise be fastened to the trailer body by a suitable fastening mechanism. Provision of a frame 52 in association with sheet 50 may facilitate handling of the sheet 50 for selectively sealing the location of splice 45 either in a retrofit or original equipment manufacturing (OEM) environment. The frame 52 may also be provided with an access opening area 56 through which a wire section may be positioned when sheet 50 is applied over splice 45, as well as an exit 58 therefrom. The opening area 56 and exit 58 may be formed as a wire accommodating arc in frame 52 or another suitable arrangement. In this manner, frame 52 can be positioned flush against the wall of the trailer 10, such as wall 40, while properly being positioned about splice 45 and effectively sealing this location and the associated wire sections 42.

Turning to FIGS. 3–4, the wiring protection system according to an embodiment of the invention as shown in more detail. In order to alleviate the problems with the prior art as shown in FIG. 2, a sealing compound formed into a sheet like member 50 is positioned to surround the spliced location 45, and associated wire sections 42 to environmentally seal, and insulate the splice 45 in the electrical wiring system. The sheet 50 has a predetermined configuration matching the splice location so as to fully encompass splice 45 and associated wire sections 42. In this manner, the portions of the wiring system adjacent electrical fixture 35 are encompassed between the sealing sheet 50 and a wall 40 of the trailer body, such as sidewall 40 as shown in FIG. 3. Thus for the particular embodiment shown in these figures, the sheet 50 may be rectilinear in configuration, having elongated sides to match the configuration of sidewall 40, while providing a width to fully encompass splice 45 and associated wire sections 42 thereunder. The sealing compound from which sheet 50 is made is also selectively secured to the sidewall 40 in a suitable manner, and the sealing material itself may have adhesive characteristics to allow it to be fully secured to sidewall 40 about splice 45 by applying pressure on the periphery thereof. Alternatively, sheet 50 may be otherwise selectively secured about splice 45 by means of another suitable fastening arrangement, such as by the use of an adhesive as an example. Of importance is that sheet 50 be sealed about splice 45 and associated wire sections 42 in an essentially airtight/moisture resistant manner to seal the arrangement from the outside environment to which the location is subjected. The sheet 50 when positioned in this manner also acts to strain relief the wire sections 42 in conjunction with splice 45, and positions the entire assembly directly adjacent wall 40 so as to minimize potential interference from external agents.

The sealing material from which sheet 50 is preferably formed may be a mastic material such as a Scotch-Seal material produced by the 3M Company. The arrangement supports the wire sections 42 and associated splice in position once the electrical connection from the wire system to the fixture 35 is made and essentially locks this position to avoid possible bending loads which could be applied to the splice area.

Turning to FIG. 5, and alternative embodiments of the sealing and protection system according to the invention is shown. As previously indicated, the invention may be utilized in either a retrofit manner, wherein the splice locations of the wiring system could be cleaned and sealing sheet 50 applied in manner as shown, or sealing sheet 50 may be positioned as part of original manufacture of trailer 10. To facilitate positioning of sheet 50, and to ensure secure fastening about splice 45, the sealing material from which sheet 50 is made may be positioned on an outer frame 52 which may be constructed of a suitable material to prevent ingress of external environmental contaminants. The frame 52 may include a plurality of fastening holes 54 or may otherwise be fastened to the trailer body by a suitable fastening mechanism. Provision of a frame 52 in association with sheet 50 may facilitate handling of the sheet 50 for selectively sealing the location of splice 45 either in a retrofit or OEM environment. The frame 52 may also be provided with an access opening area 56 through which a wire section may be positioned when sheet 50 is applied over splice 45, as well as an exit 58 therefrom. The access 56 and exit 58 may be formed as a wire accommodating arc in frame 52 or another suitable arrangement. In this manner, frame 52 can be positioned flush against the wall of the trailer 10, such as wall 40, while properly being positioned about splice 45 and effectively sealing this location and the associated wire sections 42.

Although the invention has been shown and described with respect to various preferred embodiments, it will be understood by those skilled in the art that various changes or modifications in form and detail may be made without departing from the spirit and scope of the invention as defined in the appended claims.

What is claimed is:

1. A trailer including a protection system comprising a trailer body supported at least in part on a plurality of wheels and having at least a floor associated therewith, said body including a body wiring system to supply electrical power to components situated at positions about said body, said wiring system comprising a plurality of individual wire sections being selectively coupled to said components via an electrical splice adjacent said components, and a sealing compound formed into a sheet-like member having a predetermined configuration, said member being selectively attachable to a surface of said trailer body about said electrical splice to seal said splice from the external environment and maintain the position of at least one wire of the plurality of wire sections including said splice in relation to said trailer body.

2. The trailer according to claim 1, wherein, each of said plurality of individual wire sections are coupled to said wiring system by electrical splices to allow electrical connection from said wiring system while providing continuous electrical coupling to further wire sections extending to another of said components.

3. The trailer according to claim 1, wherein, said wiring system comprises main wiring sections coupling a source of electrical power to said plurality of individual wire sections, wherein said plurality of wiring sections are positioned in wiring guides associated with said body.

4. The trailer according to claim 1, wherein, said predetermined configuration of said sheet-like member is dimensioned to fit on a side wall of said body.

5. The trailer according to claim 1, wherein, said predetermined configuration of said sheet-like member is adapted to completely cover said splice in an essentially airtight and moisture resistant manner.

6. The trailer according to claim 1, wherein, said sheet-like member includes a frame member associated therewith.

7. The trailer according to claim 6, wherein, said frame member has at least one access opening in association therewith.

8. The trailer according to claim 1, wherein, said sealing compound is formed of a material capable of self-adhering to said body.

9. The trailer according to claim 1, wherein, an adhesive material is provided on at least a portion of said sheet-like member to selectively adhere said member to said body.

10. A sealing device for selectively sealing an electrical splice in association with a trailer comprising, a sealing compound formed into a sheet-like member having a predetermined configuration, said member being selectively attachable to a surface of the trailer about an electrical splice adjacent an electrical component associated with the trailer to seal said electrical splice from the external environment and maintain the position of at least one wire section including said splice in relation to the trailer.

11. The device according to claim 10, wherein, said predetermined configuration of said sheet-like member is dimensioned to fit on a side wall of the trailer.

12. The device according to claim 10, wherein, said predetermined configuration of said sheet-like member is adapted to completely cover said splice in an essentially airtight and moisture resistant manner.

13. The device according to claim 10, wherein, said sheet-like member includes an outer frame member associated therewith.

14. The trailer according to claim 13, wherein, said frame member has at least one access opening in association therewith.

15. The device according to claim 10, wherein, said sealing compound is formed of a material capable of self-adhering to the trailer.

16. The device according to claim 10, wherein, an adhesive material is provided on at least a portion of said sheet-like member to selectively adhere said member to the trailer.

* * * * *